(12) United States Patent
Ohno et al.

(10) Patent No.: US 9,823,403 B2
(45) Date of Patent: Nov. 21, 2017

(54) LIGHT GUIDING BODY AND LIGHTING SYSTEM

(71) Applicant: KABUSHIKI KAISHA TOSHIBA, Minato-ku (JP)

(72) Inventors: Hiroshi Ohno, Yokohama (JP); Mitsuaki Kato, Kawasaki (JP); Tomonao Takamatsu, Kawasaki (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 153 days.

(21) Appl. No.: 14/627,456

(22) Filed: Feb. 20, 2015

(65) Prior Publication Data
US 2015/0268398 A1  Sep. 24, 2015

(30) Foreign Application Priority Data
Mar. 18, 2014  (JP) .................................. 2014-055651

(51) Int. Cl.
*F21V 7/04* (2006.01)
*F21V 8/00* (2006.01)

(52) U.S. Cl.
CPC ........... *G02B 6/002* (2013.01); *G02B 6/0031* (2013.01); *G02B 6/0036* (2013.01); *G02B 6/0073* (2013.01); *G02B 6/0083* (2013.01); *G02B 6/0085* (2013.01); *G02B 6/0028* (2013.01)

(58) Field of Classification Search
CPC ............................. G02B 6/002; G02B 6/0028
See application file for complete search history.

(56) References Cited

U.S. PATENT DOCUMENTS 8,206,017 B2 *  6/2012  Zwick ................. G02B 6/0036
362/511
2001/0012157 A1  8/2001  Suzuki et al.
2008/0260328 A1  10/2008  Epstein
(Continued)

FOREIGN PATENT DOCUMENTS

CN  101558352 A  10/2009
CN  101666466 A  3/2010
(Continued)

OTHER PUBLICATIONS

Extended European Search Report dated Aug. 5, 2015 in Patent Application No. 15151920.4.
(Continued)

*Primary Examiner* — Evan Dzierzynski
(74) *Attorney, Agent, or Firm* — Oblon, McClelland, Maier & Neustadt, L.L.P.

(57) ABSTRACT

A light guiding body includes, an introducing portion including a plane of incidence and a plane of reflection opposite to the plane of incidence, a diffusion portion including a first plane provided on a side of the plane of reflection and a second plane provided on the side of the plane of incidence and opposite to the first plane, a first point positioned on a border between the plane of reflection and the first plane, and a second point on the plane of incidence, wherein when a center of curvature of the first plane at the first point is a third point, an index of refraction of the light guiding body is n, the curvature of the first plane at the first point is K, and a distance between the second point and the third point is D, Formula (4) is satisfied.

12 Claims, 5 Drawing Sheets

(56) References Cited

U.S. PATENT DOCUMENTS

| | | |
|---|---|---|
| 2010/0296268 A1 | 11/2010 | Fasham et al. |
| 2012/0139403 A1 | 6/2012 | Johnston |
| 2012/0320580 A1 | 12/2012 | Liang |
| 2013/0003398 A1* | 1/2013 | Godbillon ........... F21S 48/2237 362/511 |
| 2013/0051076 A1 | 2/2013 | Mizuno et al. |
| 2013/0114293 A1* | 5/2013 | Morino ................. G02B 6/002 362/608 |
| 2013/0162139 A1 | 6/2013 | Liu |
| 2013/0223077 A1 | 8/2013 | Kato et al. |
| 2013/0235608 A1* | 9/2013 | Tsai .................... G02B 6/0008 362/551 |

FOREIGN PATENT DOCUMENTS

| | | |
|---|---|---|
| GB | 2 443 215 A | 4/2008 |
| JP | 2013-175406 A | 9/2013 |
| JP | 2013-229195 A | 11/2013 |

OTHER PUBLICATIONS

Office Action dated Jul. 5. 2017, in Chinese Patent Application No. 201510072394.6.

* cited by examiner

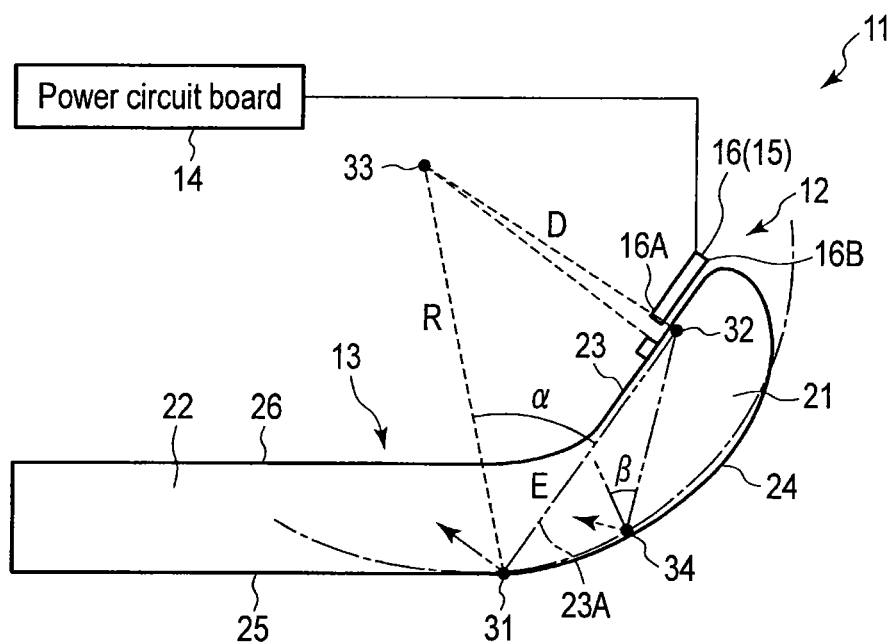
F I G. 1
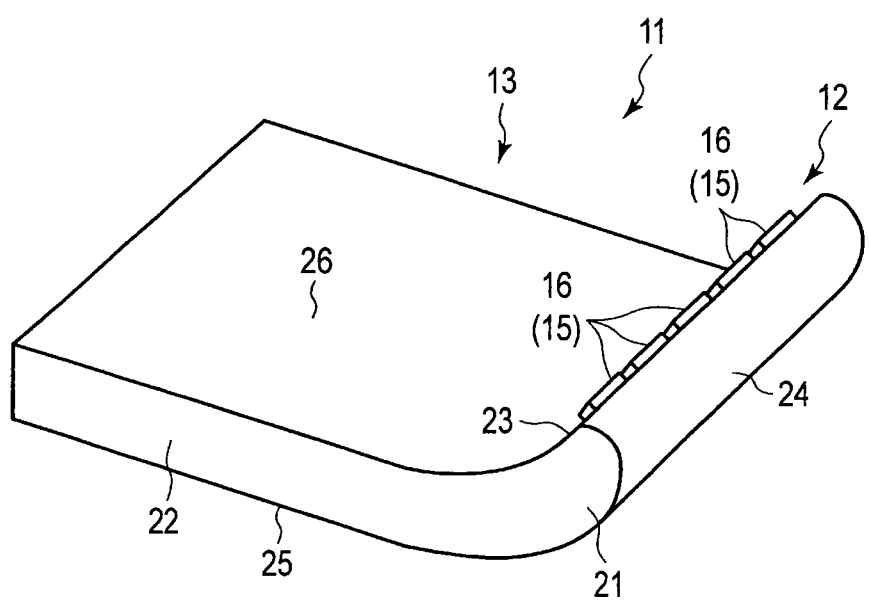
F I G. 2

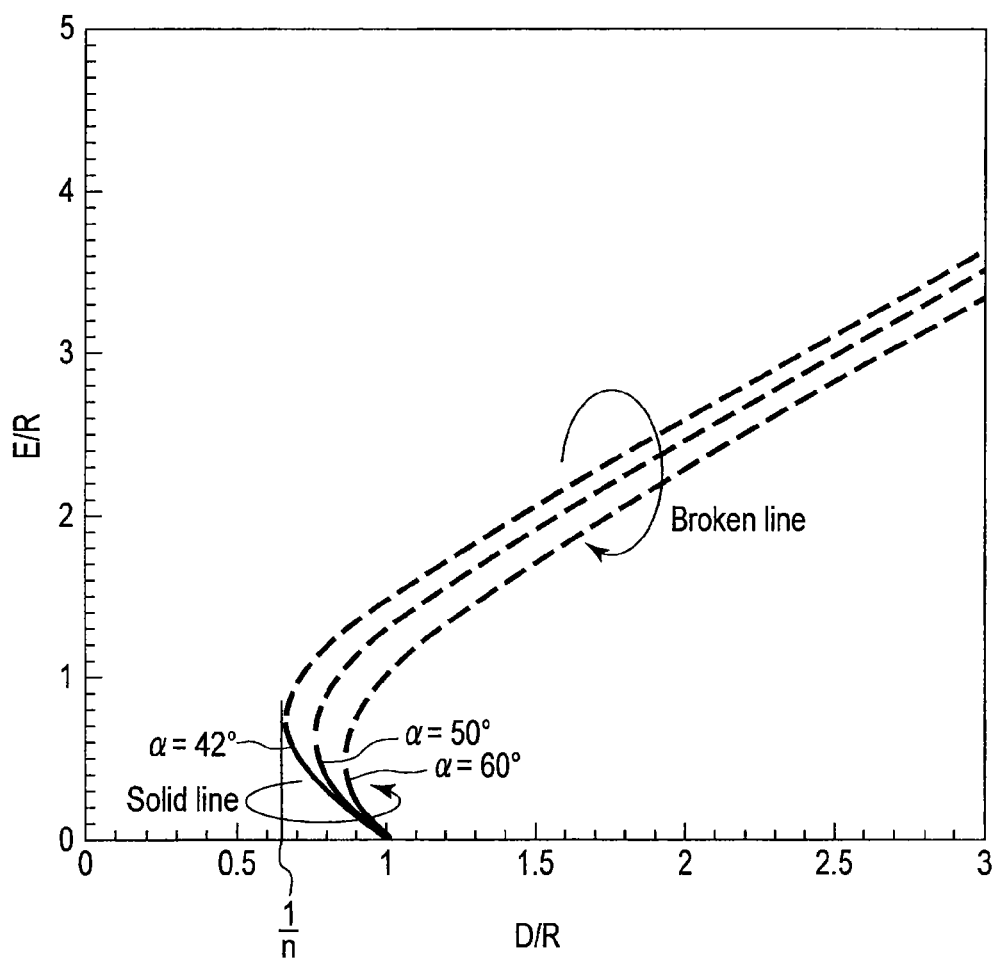
F I G. 3

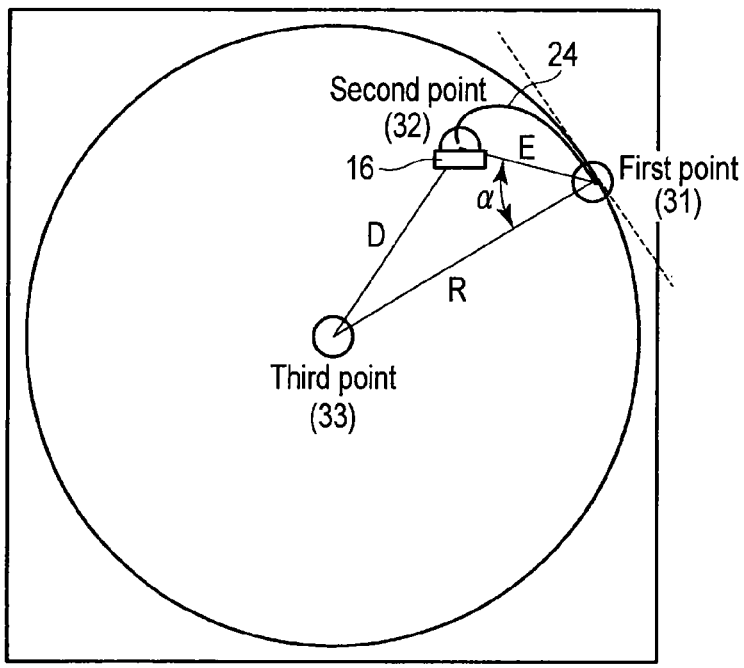
F I G. 4
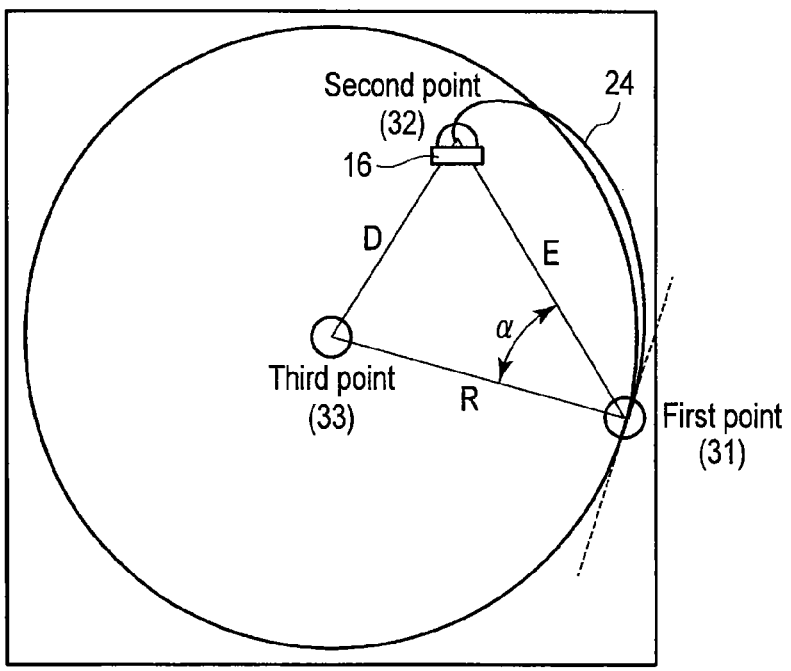
F I G. 5

… (1)

LIGHT GUIDING BODY AND LIGHTING SYSTEM

CROSS-REFERENCE TO RELATED APPLICATION

This application is based upon and claims the benefit of priority from prior Japanese Patent Application No. 2014-055651, filed Mar. 18, 2014, the entire contents of which are incorporated herein by reference.

FIELD

Embodiments described herein relate generally to a light guiding body that guides light and a lighting system using the light guiding body.

BACKGROUND

There is a type of LED illumination in which light from an LED is guided into a light guiding body and at the same time, the light is diffused to the outside by a diffuser included in the light guiding body. Particularly, if a curved shape is provided in the light guiding body, added value can be increased as design illumination. A curved surface can be approximated by an R shape (a circular shape in a certain cross section) in a local region.

For example, Patent Literature 1 is known as an example of a case in which a light guiding body has an R shape. An LED is used as a light source and light from the light source is guided into a light guiding body by using a metal reflector. By adopting such a structure, direct light from an LED can be blocked by the reflector. Thus, glare of direct light can be reduced. However, the metal reflector absorbs about 10% of light in one reflection. Thus, a lower light output ratio results.

BRIEF DESCRIPTION OF THE DRAWINGS

FIG. 1 is a sectional view schematically showing a lighting system according to a first embodiment;

FIG. 2 is a perspective view showing the lighting system shown in FIG. 1 from obliquely above;

FIG. 3 is a graph showing Formula (5) for a light guiding body of the lighting system shown in FIG. 1;

FIG. 4 is a schematic diagram showing a physical relationship of a first point, a second point, and a third point corresponding to solid line portions of curves shown in FIG. 3;

FIG. 5 is a schematic diagram showing the physical relationship of a first point, a second point, and a third point corresponding to broken line portions of curves shown in FIG. 3;

DETAILED DESCRIPTION

First Embodiment

Figure 6:
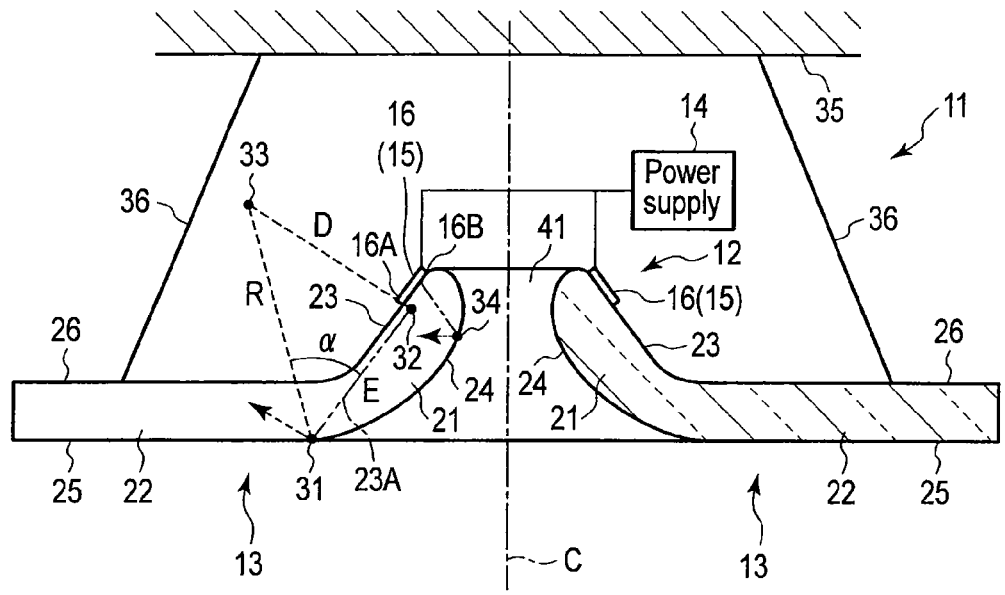
FIG. 6 is a sectional view schematically showing a lighting system according to a second embodiment.

The first embodiment of a lighting system will be described below with reference to FIGS. 1 to 5. A lighting system 11 according to the first embodiment is used by being mounted on, for example, the surface of a ceiling or installed inside an indentation provided in the ceiling.

As shown in FIGS. 1 and 2, the lighting system 11 includes a light source 12, a light guiding body 13 that guides light from the light source 12 by allowing the light to pass inside, and a power circuit board 14 that supplies power to the light source 12.

The light source 12 includes a board 15 (printed wiring board) and a plurality of LEDs 16 (light emitting devices) installed on the board 15. The plurality of LEDs 16 are arranged, for example, on the same straight line at regular intervals. A small gap (for example, about 0.5 mm) is provided between the LED 16 and a plane of incidence 23 of the light guiding body 13. However, this gap is not limited. The LED 16 is formed like a plate and extends along the plane of incidence 23. The LED 16 includes a first end 16A on the side of a diffusion portion 22 and a second end 16B on the opposite side of the first end 16A.

The light guiding body 13 is formed like a bent plate as shown in FIG. 2 by extrusion molding using a die in a shape shown in FIG. 1. The light guiding body 13 includes an introducing portion 21 where light from the light source 12 is incident and the diffusion portion 22 connected to the introducing portion 21. The light guiding body 13 including the introducing portion 21 and the diffusion portion 22 is integrally formed from a transparent material (translucent material) like, for example, acrylic. However, the material of the light guiding body 13 is not limited to acrylic and may be polycarbonate, glass or the like. When the light guiding body 13 is formed from acrylic, the index of refraction n is 1.49.

As shown in FIGS. 1 and 2, the introducing portion 21 includes the plane of incidence 23 opposite to the light source 12 (LED 16) and a plane of reflection 24 connected to the plane of incidence 23 and opposite to the plane of incidence 23. Similarly, the diffusion portion 22 includes a first plane 25 positioned on the side of the plane of reflection 24 and a second plane 26 opposite to the first plane 25 and positioned on the side of the plane of incidence 23. The first plane 25 is a so-called emission surface to emit light to the outside and is formed with, for example, a mirror finish. The second plane 26 is a so-called diffusion surface that diffusively reflects light guided from the side of the introducing portion 21 toward the emission surface (first plane 25). The second plane 26 is surface-treated such that a surface roughness thereof is made rougher by, for example, sandblasting. However, the configuration of the second plane 26 is not limited to the above example and the second plane 26 may be printed with white dots by, for example, silk-screen printing such that light is diffusively reflected toward the emission surface.

As shown in FIG. 1, the light guiding body 13 includes a first point 31 positioned on the border between the plane of reflection 24 and the first plane 25 and a second point 32 positioned opposite to the light source 12 (LED 16) on the plane of incidence 23. The second point 32 is positioned in the neighborhood of the first end 16A. The lighting system 11 further includes a third point 33 as a center of curvature of the first plane 25 at the first point 31 (in the neighborhood of the first point 31).

The plane of incidence of the introducing portion 21 is smoothly formed along the surface of the LED 16 (light emitting device). A plane 23A containing the plane of incidence intersects the first point 31. The plane 23A containing the plane of incidence is not limited to a case in which the plane 23A intersects the first point 31 and may be configured to intersect the plane of reflection 24.

The plane of reflection 24 is formed in an arc shape. More specifically, the plane of reflection 24 is formed as a curve satisfying the following condition such that light entering from the plane of incidence 23 can be reflected totally to the side of the diffusion portion 22. If the index of refraction of the light guiding body 13 is n, the plane of reflection 24 is formed such that an angle β formed by a line segment connecting the second point 32 on the plane of incidence 23 and a fourth point 34 as an arbitrary point on the plane of reflection 24 and a normal of the plane of reflection 24 at the fourth point 34 satisfies the following formula:

$$\beta \geq \sin^{-1}\left(\frac{1}{n}\right) \quad \text{Formula (1)}$$

Total reflection is a physical phenomenon in which when a light beam travels from a region of a higher index of refraction to a region of a lower index of refraction, the light beam is almost 100% reflected at the interface formed by these regions if the angle formed by a normal direction of the interface and a light beam direction is equal to a critical angle or more.

The first plane 25 near the first point 31 is formed under the following condition such that light entering from the plane of incidence 23 is totally reflected to the side of the second plane 26. That is, if the angle formed by a line segment connecting the first point 31 and the second point 32 and the normal of the first plane 25 at the first point 31 is α, $$\sin^{-1}\left(\frac{1}{n}\right) \leq \alpha \quad \text{Formula (2)}$$

is satisfied.

Assume a triangle is formed by the first point 31, the second point 32, and the third point 33. If the distance between the second point 32 and the third point 33 is D, $$R \sin \alpha \leq D$$

is needed can be said so that such a triangle is established, that is, such the first point 31, the second point 32, and the third point 33 are existing. Thus, $$R \sin \alpha \leq D$$

holds, therefore, $$\sin \alpha \leq \frac{D}{R}$$

holds, and therefore, if the curvature of the first plane 25 near the first point 31 is K, $$\frac{\sin \alpha}{D} \leq \frac{1}{R} = K \quad \text{Formula (3)}$$

holds.

From Formula (2), $$\sin \alpha \geq \frac{1}{n}$$

holds and substituting this into Formula (3), $$\frac{1}{nD} \leq K \quad \text{Formula (4)}$$

is obtained. That is, in the present embodiment, the curvature K of the first plane 25 near the first point 31 is set such that Formula (4) is satisfied.

More specifically, the curvature K of the first plane 25 near the first point 31 is formed as described below. That is, if the distance between the first point 31 and the second point 32 is E, the curvature K of the first plane 25 at the first point 31 (near the first point 31) is given by $$K = \frac{\cos \alpha E \pm \sqrt{D^2 - \sin^2 \alpha E^2}}{E^2 - D^2} \quad \text{Formula (5)}$$

where a value satisfying Formula (2) is set to α.

Formula (5) is expressed by solid line portions and broken line portions of curves in the graph shown in FIG. 3. In this case, Formula (5) with a negative second term in the numerator corresponds to solid lines and Formula (5) with a positive second term in the numerator corresponds to broken lines.

Formula (5) can be obtained by transforming a cosine theorem formula. In FIG. 3, curves of Formula (5) when α is 42°, 50°, and 60° are shown.

FIG. 4 schematically shows the physical relationship of solid line portions of curves shown in FIG. 3. As shown in FIG. 4, the length of the plane of reflection 24 can be made shorter in solid line portions of curves of Formula (5). Thus, the introducing portion 21 can be made compact.

FIG. 5 schematically shows the physical relationship of broken line portions of curves shown in FIG. 3. As shown in FIG. 5, when compared with FIG. 4, the length of the plane of reflection 24 becomes longer in broken line portions of curves of Formula (5). Thus, the size of the introducing portion 21 increases. Therefore, it is preferable to design the light guiding body 13 within the range of solid line portions of Formula (5). That is, Formula (5) with a negative second term in the numerator is preferable.

From solid line portions of curves (Formula (5)) in the graph of FIG. 3, if the light guiding body 13 is designed within the range of $$\frac{1}{n} \leq \frac{D}{R} < 1$$

the length of the plane of reflection 24 becomes shorter, which can be understood to be preferable. K=1/R and therefore, $$\frac{1}{nD} \leq K < \frac{1}{D} \quad \text{Formula (6)}$$

is obtained.

Subsequently, the working of the lighting system 11 according to the present embodiment will be described with reference to FIG. 1 and the like. In the present embodiment, the plane of reflection 24 is formed such that Formula (1) is satisfied at any point (fourth point) on the plane of reflection 24. Thus, light emitted from the light source 12 (LED 16) toward the plane of reflection 24 is totally reflected and guided toward the diffusion portion 22.

Similarly, in the present embodiment, the first plane 25 near the first point 31 is formed such that Formulas (2), (4), (5), and (6) are satisfied. Thus, light emitted from the light source 12 (LED 16) toward the first plane 25 near the first point 31 (or at the first point 31) is totally reflected and guided toward the diffusion portion 22.

The light guided to the diffusion portion 22 is diffused by the second plane 26 as a diffusion surface before being emitted to the outside via the first plane 25.

According to the first embodiment, the light guiding body 13 that guides light includes the introducing portion 21 having the plane of incidence 23 and the plane of reflection 24 opposite to the plane of incidence 23, the diffusion portion 22 having the first plane 25 provided on the side of the plane of reflection 24 and the second plane 26 provided on the side of the plane of incidence 23 and opposite to the first plane 25, the first point 31 positioned on the border between the plane of reflection 24 and the first plane 25, and the second point 32 on the plane of incidence 23 and if the center of curvature of the first plane 25 at the first point 31 is the third point 33, the index of refraction of the light guiding body 13 is n, the curvature of the first plane 25 is K, and the distance between the second point 32 and the third point 33 is D, Formula (4) is satisfied.

According to the configuration, a triangle formed from the first point 31, the second point 32, and the third point 33 is established and based on the condition of Formula (4), light from the light source 12 incident from the second point 32 is totally reflected at the first point 31. Thus, the light from the light source 12 is not leaked out at the first point 31 of the light guiding body 13 and an occurrence of luminance unevenness at the first point 31 can be prevented. That is, light can be emitted to the outside from inside the light guiding body 13 in an intended position and, for example, light passing through the introducing portion 21 can be prevented from going out from the first point 31 without being diffused. Conventionally, when luminance unevenness occurs at the first point 31 or the user finds light leaked out from the first point 31 glaring, it is necessary to provide a cover in the position of the first point 31 for screening. According to the above configuration, such a cover can be made unnecessary and the structure can be made simpler.

The plane 23A containing the plane of incidence intersects one of the plane of reflection 24 and the first point 31. According to the configuration, light entering from the plane of incidence 23 can be caused to be reflected on the plane of reflection 24 or at the first point 31. Accordingly, for example, a malfunction in which light entering from the plane of incidence 23 is directly shone on the diffusion portion 22 and unintentionally emitted to the outside without being diffused can be prevented from occurring.

If the distance between the first point 31 and the second point 32 is E and the angle formed by a line segment formed by the first point 31 and the second point 32 and the normal to the first plane 25 at the first point 31 is α, Formula (5) is satisfied. According to the configuration, the curvature of the first plane 25 at the first point 31 can be determined more concretely depending on the distance E between the first point 31 and the second point 32 and the distance D between the second point 32 and the third point 33. Accordingly, the load of workers during design work can be reduced.

In this case, Formula (6) is satisfied. According to the configuration, as is evident from the graph of Formula (5) shown in FIG. 3, the distance E between the first point 31 and the second point 32 can be shortened. Accordingly, the length of the introducing portion 21 (plane of reflection 24) can be shortened and the light guiding body 13 can be made compact. Accordingly, a slimmed down lighting system 11 can be realized.

In the present embodiment, if a point on the plane of reflection 24 is set as the fourth point 34, an angle β formed by a line segment formed by the second point 32 and the fourth point 34 and the normal to the first plane 25 at the fourth point 34 satisfies Formula (1). According to the configuration, not only light shone from the second point 32 to the first point 31, but also light shone from the second point 32 toward the plane of reflection 24 can be caused to be totally reflected on the plane of reflection 24 to the side of the diffusion portion 22. Accordingly, the light guiding body 13 that is highly efficient and the lighting system 11 using the light guiding body can be realized by preventing light from leaking out from the plane of reflection 24.

Further in the present embodiment, the plane 23A containing the plane of incidence intersects the first point 31. According to the configuration, when compared with a case in which the plane 23A containing the plane of incidence intersects the plane of reflection 24, the plane of reflection 24 (introducing portion 21) can be realized more compactly.

The lighting system 11 according to the present embodiment includes the light guiding body 13 and the LED 16 provided opposite to the plane of incidence 23 and formed like a plate along the plane of incidence 23 and the second point 32 is positioned near the end of the LED 16 on the side of the diffusion portion 22. According to the configuration, the angle of incidence of light from the LED 16 traveling toward the first point 31 by passing through the plane of incidence 23 at a position farther from the diffusion portion 22 than the second point 32 can be made a critical angle or more. Similarly, the angle of incidence of light from the LED 16 traveling toward the plane of reflection 24 by passing through the plane of incidence 23 at a position farther from the diffusion portion 22 than the second point 32 can be made the critical angle or more. Accordingly, light entering from the plane of incidence 23 does not leak out at an unintentioned position and a lighting system 11 that is highly efficient (offering a high light output ratio) can be realized.

Second Embodiment

Subsequently, the second embodiment of a lighting system 11 will be described with reference to FIG. 6. Hereinafter, portions that are different from the first embodiment will mainly be described and the illustration or description of portions common to the first embodiment will is omitted. The lighting system 11 according to the second embodiment is used by being hung from a ceiling 35 using a string 36 or the like.

As shown in FIG. 6, the lighting system 11 includes a light source 12, a light guiding body 13 into which light from the light source 12 is passed, and a power circuit board 14 that supplies power to the light source 12.

The light source 12 includes a plurality of boards 15 (printed wiring boards) and a plurality of LEDs 16 (light emitting devices) installed on each of the plurality of boards 15. The plurality of LEDs 16 are arranged in a circle around a center axis C of the lighting system 11, for example, at regular intervals. A small gap (for example, about 0.5 mm) is provided between the LED 16 and a plane of incidence 23 of the light guiding body 13. The LED 16 is formed like a plate and includes a first end 16A on the side of a diffusion portion 22 and a second end 16B on the opposite side of the first end 16A. In the present embodiment, the plurality of LEDs 16 emit light obliquely in a direction approaching the center axis C with an increasing distance from the ceiling 35.

The light guiding body 13 has a substantial disc shape and includes a through hole portion 41 extending along the center axis C in the center thereof. In the present embodiment, the light source 12 (LED 16) is naturally air-cooled by providing the through hole portion 41 in the center, achieving good heat dissipation of the light source 12.

The light guiding body 13 includes an introducing portion 21 where light from the light source 12 is incident and the diffusion portion 22 connected to the introducing portion 21. The light guiding body 13 including the introducing portion 21 and the diffusion portion 22 is integrally formed from a transparent material like, for example, acrylic. The diffusion portion 22 has a flat ring shape and is arranged at a position farther from the center axis C than the introducing portion 21. The introducing portion 21 is provided at a position near the center axis C (position in the neighborhood of the center axis C) and projects in a direction approaching the ceiling 35 from inside the diffusion portion 22. In other words, the introducing portion 21 is inclined with respect to the diffusion portion 22 so as to approach the ceiling 35 with a decreasing distance from the center axis C.

As shown in FIG. 6, the introducing portion 21 includes the plane of incidence 23 opposite to the light source 12 (LED 16) and a plane of reflection 24 connected to the plane of incidence 23 and opposite to the plane of incidence 23. Similarly, the diffusion portion 22 includes a first plane 25 positioned on the side of the plane of reflection 24 and a second plane 26 opposite to the first plane 25 and positioned on the side of the plane of incidence 23. The first plane 25 is a so-called emission surface to emit light to the outside. The second plane 26 is a so-called diffusion surface that diffusively reflects light guided from the side of the introducing portion 21 toward the emission surface (first plane 25). The second plane 26 is surface-treated such that a surface roughness thereof is made rougher by, for example, sandblasting.

The light guiding body 13 includes a first point 31 positioned on the border between the plane of reflection 24 and the first plane 25 and a second point 32 positioned opposite to the light source 12 (LED 16) on the plane of incidence 23. The second point 32 is positioned in the neighborhood of the first end 16A. The lighting system 11 further includes a third point 33 as a center of curvature of the first plane 25 at the first point 31 (in the neighborhood of the first point 31).

The plane of incidence 23 of the introducing portion 21 is smoothly formed along the surface of the LED 16 (light emitting device). The plane of reflection 24 is formed in an arc shape. More specifically, like in the first embodiment, the plane of reflection 24 is formed such that Formula (1) in the first embodiment is satisfied so as to be able to totally reflect light entering from the plane of incidence 23 to the side of the diffusion portion 22.

The first plane 25 near the first point 31 is formed, like in the first embodiment, such that Formulas (2), (4), (5), and (6) in the first embodiment are satisfied so as to totally reflect light entering from the plane of incidence 23 to the side of the second plane 26. Thus, the light guiding body 13 can guide light from a plurality of LEDs 16 in a direction moving away from the center axis C.

Subsequently, the working of the lighting system 11 according to the present embodiment will be described with reference to FIG. 6 and the like. In the present embodiment, the plane of reflection 24 is formed such that Formula (1) is satisfied at any point (fourth point) on the plane of reflection 24. Thus, light emitted from the light source 12 (LED 16) toward the plane of reflection 24 is totally reflected and guided toward the diffusion portion 22 (see FIG. 1).

Similarly, in the present embodiment, the first plane 25 near the first point 31 is formed such that Formulas (2), (4), (5), and (6) are satisfied. Thus, light emitted from the light source 12 (LED 16) toward the first plane 25 near the first point 31 (or at the first point 31) is totally reflected and guided toward the diffusion portion 22.

The light guided to the diffusion portion 22 is diffused by the second plane 26 as a diffusion surface before being emitted to the outside via the first plane 25.

According to the second embodiment, the light guiding body 13 includes a through hole portion 41 extending along the center axis C. According to the configuration, the surrounding air can move via the through hole portion 41 and so heat dissipation of the light source 12 can be improved.

The introducing portion 21 is arranged near the center axis C and the diffusion portion 22 is arranged in a position farther from the center axis C than the introducing portion 21. According to the configuration, the plurality of LEDs 16 opposite to the plane of incidence 23 of the introducing portion 21 can be arranged in close proximity in the neighborhood of the center axis C. Thus, heat from the plurality of LEDs 16 is efficiently dissipated via the through hole portion 41 and also wires supplying power to the plurality of LEDs 16 can be made shorter.

The plurality of LEDs 16 emit light in a direction approaching the center axis C and the light guiding body 13 guides the light from the plurality of LEDs 16 in a direction moving away from the center axis C. According to the configuration, both of widely distributed light and improvement of added value as design illumination can be realized thanks to the direction in which light of the plurality of LEDs 16 is emitted and the action of the light guiding body 13.

The light guiding body 13 has a substantial disc shape in the present embodiment, but the shape of the light guiding body 13 is not limited to the above example. The lighting system 11 may be realized by the two light guiding bodies 13 formed in a shape as shown in FIG. 2 by extrusion molding being opposed in a physical relationship in which the introducing portions 21 are opposite to each other as shown in FIG. 6. In this modification, the plurality of LEDs 16 are arranged, for example, on the same straight line at regular intervals.

Third Embodiment

Subsequently, the third embodiment of a lighting system will be described with reference to FIG. 7. Hereinafter, portions that are different from the first embodiment will mainly be described and the illustration or description of portions common to the first embodiment will be omitted. A lighting system 11 according to the third embodiment is used by being hung from a ceiling using a string 36 or the like.

Figure 7:
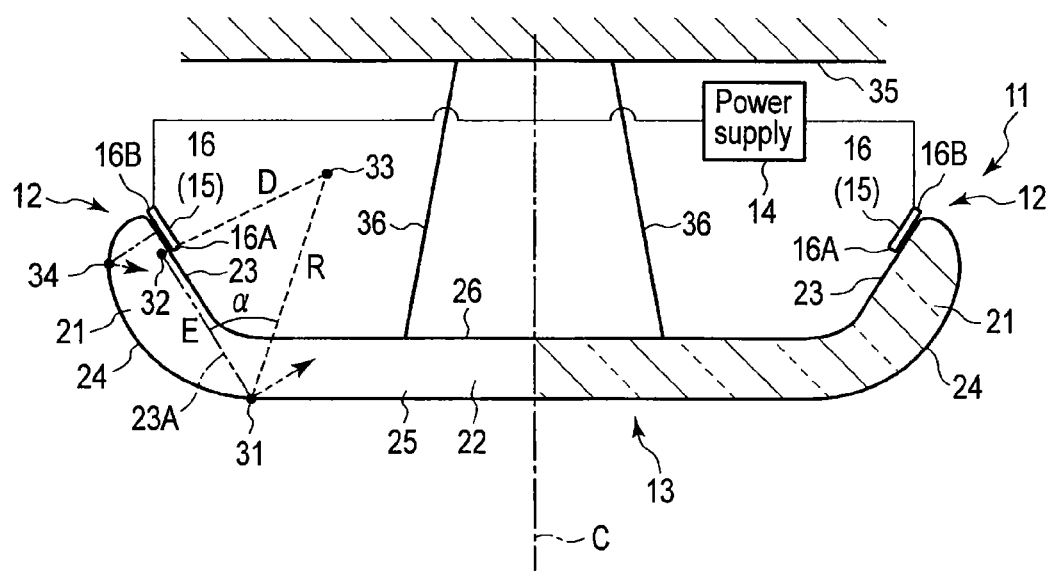
FIG. 7 is a sectional view schematically showing a lighting system according to a third embodiment.

As shown in FIG. 7, the lighting system 11 includes a light source 12, a light guiding body 13 into which light from the light source 12 is passed, and a power circuit board 14 that supplies power to the light source 12.

The light source 12 includes a plurality of boards 15 (printed wiring boards) and a plurality of LEDs 16 (light emitting devices) installed on each of the plurality of boards 15. The plurality of LEDs 16 are arranged in a circle around a center axis C of the lighting system 11, for example, at regular intervals. A small gap (for example, about 0.5 mm) is provided between the LED 16 and a plane of incidence 23 of the light guiding body 13. The LED 16 is formed like a plate and includes a first end 16A on the side of a diffusion portion 22 and a second end 16B on the opposite side of the first end 16A. In the present embodiment, the plurality of LEDs 16 emit light obliquely in a direction moving away from the center axis C with an increasing distance from a ceiling 35.

The light guiding body 13 has a dish shape in which an outer edge rises. The light guiding body 13 includes an introducing portion 21 where light from the light source 12 is incident and the diffusion portion 22 connected to the introducing portion 21. The light guiding body 13 including the introducing portion 21 and the diffusion portion 22 is integrally formed from a transparent material like, for example, acrylic. The diffusion portion 22 is provided in a portion where the center axis C passes and the neighborhood thereof and has a disc shape. The introducing portion 21 is provided at a position (outer edge) farther from the center axis C than the diffusion portion 22 and projects in a direction approaching the ceiling 35 from outside the diffusion portion 22. In other words, the introducing portion 21 is inclined with respect to the diffusion portion 22 so as to move away from the ceiling 35 with an increasing distance from the center axis C.

As shown in FIG. 7, the introducing portion 21 includes the plane of incidence 23 opposite to the light source 12 (LED 16) and a plane of reflection 24 connected to the plane of incidence 23 and opposite to the plane of incidence 23. Similarly, the diffusion portion 22 includes a first plane 25 positioned on the side of the plane of reflection 24 and a second plane 26 opposite to the first plane 25 and positioned on the side of the plane of incidence 23. The first plane 25 is a so-called emission surface to emit light to the outside. The second plane 26 is a so-called diffusion surface that diffusively reflects light guided from the side of the introducing portion 21 toward the emission surface (first plane 25). The second plane 26 is surface-treated such that a surface roughness thereof is made rougher by, for example, sandblasting.

The light guiding body 13 includes a first point 31 positioned on the border between the plane of reflection 24 and the first plane 25 and a second point 32 positioned opposite to the light source 12 (LED 16) on the plane of incidence 23. The second point 32 is positioned in the neighborhood of the first end 16A. The lighting system 11 further includes a third point 33 as a center of curvature of the first plane 25 at the first point 31 (in the neighborhood of the first point 31).

The plane of incidence 23 of the introducing portion 21 is smoothly formed along the surface of the LED 16 (light emitting device). The plane of reflection 24 is formed in an arc shape. More specifically, like in the first embodiment, the plane of reflection 24 is formed such that Formula (1) in the first embodiment is satisfied so as to be able to totally reflect light entering from the plane of incidence 23 to the side of the diffusion portion 22.

The first plane 25 near the first point 31 is formed, like in the first embodiment, such that Formulas (2), (4), (5), and (6) in the first embodiment are satisfied so as to totally reflect light entering from the plane of incidence 23 to the side of the second plane 26. Thus, the light guiding body 13 can guide light from a plurality of the LEDs 16 in a direction approaching the center axis C.

Subsequently, the working of the lighting system 11 according to the present embodiment will be described with reference to FIG. 7 and the like. In the present embodiment, the plane of reflection 24 is formed such that Formula (1) is satisfied at any point (fourth point 34) on the plane of reflection 24. Thus, light emitted from the light source 12 (LED 16) toward the plane of reflection 24 is totally reflected and guided toward the diffusion portion 22 (see FIG. 1).

Similarly, in the present embodiment, the first plane 25 near the first point 31 is formed such that Formulas (2), (4), (5), and (6) are satisfied. Thus, light emitted from the light source 12 (LED 16) toward the first plane 25 near the first point 31 (or at the first point 31) is totally reflected and guided toward the diffusion portion 22.

The light guided to the diffusion portion 22 is diffused by the second plane 26 as a diffusion surface before being emitted to the outside via the first plane 25.

According to the third embodiment, the diffusion portion 22 is arranged near the center axis C and the introducing portion 21 is arranged at a position farther from the center axis C than the diffusion portion 22. According to the configuration, the plurality of LEDs 16 as a heat source can be arranged opposite to the plane of incidence 23 of the introducing portion 21 on the outer edge side of the light guiding body 13. Accordingly, the lighting system 11 that can easily dissipate heat of the LEDs 16 to the outside can be realized.

The plurality of LEDs 16 emit light in a direction moving away from the center axis C and the light guiding body 13 guides the light from the plurality of LEDs 16 in a direction approaching the center axis C. According to the configuration, both of widely distributed light and improvement of added value as design illumination can be realized through the direction in which light of the plurality of LEDs 16 is emitted and action of the light guiding body 13.

Figure 8:
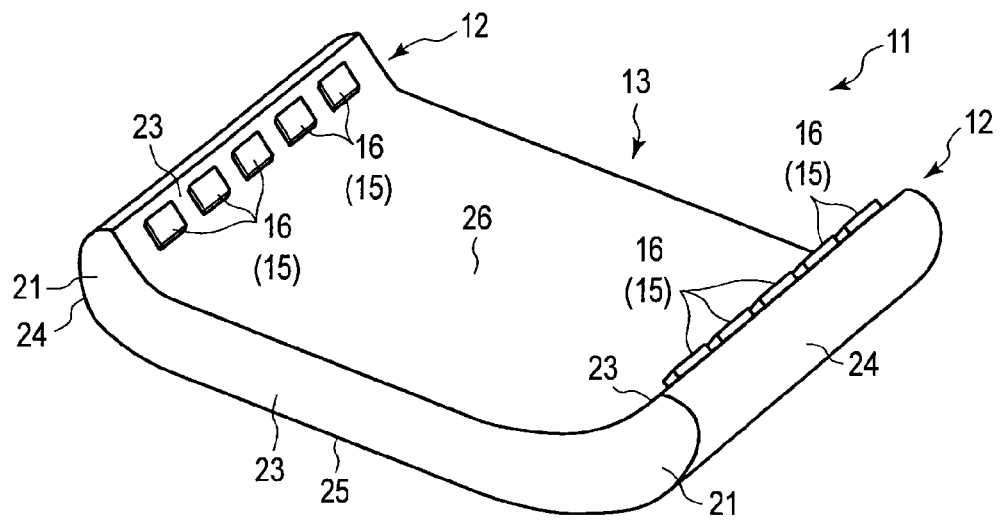
FIG. 8 is a perspective view showing a modification of the lighting system according to the third embodiment.

The light guiding body 13 has a dish shape in the present embodiment, but the shape of the light guiding body 13 is not limited to the above example. The lighting system 11 may be realized by using the light guiding body 13 formed in a shape as shown in FIG. 8 by extrusion molding. In this modification, the plurality of LEDs 16 are arranged, for example, on the same straight line at regular intervals.

Fourth Embodiment

Subsequently, the fourth embodiment of a lighting system 11 will be described with reference to FIG. 9. Hereinafter, portions that are different from the first embodiment will mainly be described and the illustration or description of portions common to the first embodiment will be omitted.

The lighting system 11 according to the fourth embodiment is a so-called bulb type lamp and is used by being inserted into a socket.

Figure 9:
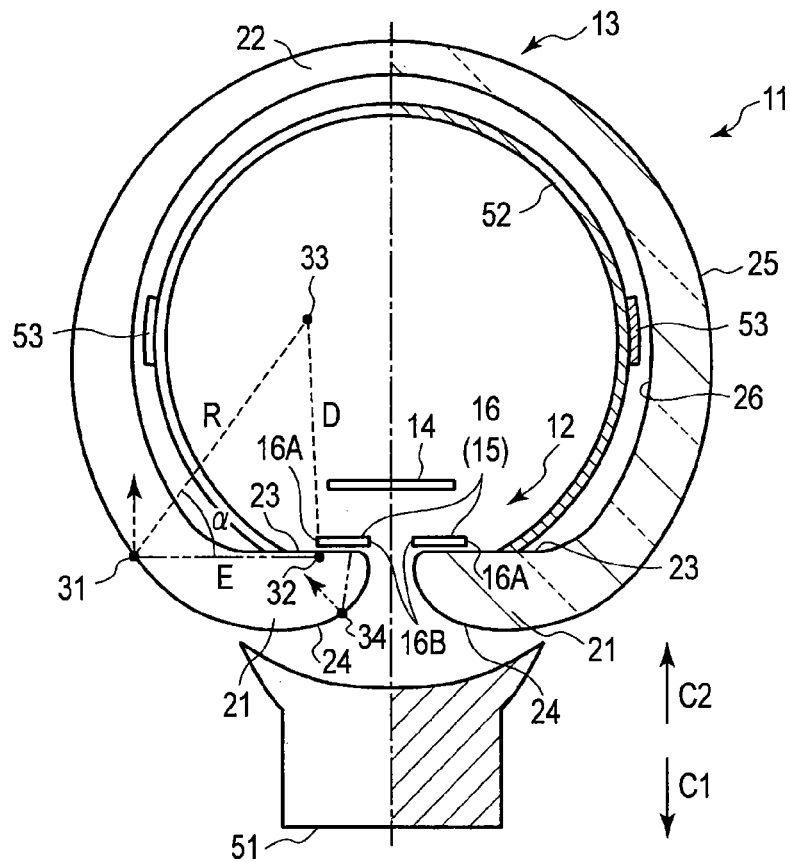
FIG. 9 is a sectional view schematically showing a lighting system according to a fourth embodiment.

As shown in FIG. 9, the lighting system 11 includes a light source 12, a light guiding body 13 into which light from the light source 12 is passed, a power circuit board 14 accommodated inside the light guiding body 13 to supply power to the light source 12, and a base 51 to which these units are fixed directly or indirectly. The base 51 is provided opposite to the plane of reflection 24 of the light guiding body 13. The power circuit board 14 is configured by common components and may include a rectifier circuit, a communication circuit to turn on and off the power, or the like.

The lighting system 11 includes a heat transfer portion 52 for heat dissipation inside the light guiding body 13. The heat transfer portion 52 is formed from a metal material, for example, an aluminum alloy in a spherical shape. The heat transfer portion 52 is thermally connected to the base 51 and the LED 16 and can dissipate heat generated in the LED 16 to the outside via the air therearound and the light guiding body 13.

The outer circumferential surface of the heat transfer portion 52 is coated white, but may also be coated in other colors (blue, yellow, green, red, pink, orange, black or other colors) or the coating may be omitted to expose the color of the aluminum alloy. Various paints can be used as a paint used to coat the outer circumferential surface of the heat transfer portion 52 with the paint and the paint may be a paint that changes in color depending on the temperature or a paint that glows in the dark (luminous paint) when the lighting system 11 is turned off.

The heat transfer portion 52 further includes a marking surface 53 (marking portion) formed by coating the surface with paint. For example, a trademark or logo of a company, a product name, a model number, notes such as "Hot", or a description of a product can be marked on the marking surface 53. Because the light guiding body 13 is transparent, the user can visually recognize the coating of the outer circumferential surface of the heat transfer portion 52 and the marking surface 53 from the outside. When the lighting system 11 is turned on, on the other hand, the light guiding body 13 emits light and so it is difficult to visually recognize the coating of the outer circumferential surface of the heat transfer portion 52 and the marking surface 53 inside the light guiding body from the outside.

The light source 12 includes a plurality of boards 15 (printed wiring boards) and a plurality of LEDs 16 (light emitting devices) installed on each of the plurality of boards 15. The plurality of LEDs 16 are arranged in a circle around a center axis C of the lighting system 11 at regular intervals. A small gap (about 0.5 mm) is provided between the LED 16 and a plane of incidence 23 of the light guiding body 13. The LED 16 is formed like a plate and includes a first end 16A on the side of a diffusion portion 22 and a second end 16B on the opposite side of the first end 16A. The plurality of LEDs 16 can emit light in a direction in which the base 51 is present (direction C1 in which the base 51 projects).

The light guiding body 13 has a substantially spherical shape. The light guiding body 13 includes an introducing portion 21 where light from the light source 12 is incident and the diffusion portion 22 connected to the introducing portion 21. The light guiding body 13 including the introducing portion 21 and the diffusion portion 22 is integrally formed from a transparent material like, for example, acrylic. The diffusion portion 22 has a substantially spherical shape projecting in a direction C2 opposite to the direction C1 in which the base 51 projects. The light guiding body 13 can guide light from the plurality of LEDs 16 in a direction moving away from the base 51 (opposite direction C2).

As shown in FIG. 9, the introducing portion 21 includes the plane of incidence 23 opposite to the light source 12 (LED 16) and a plane of reflection 24 connected to the plane of incidence 23 and opposite to the plane of incidence 23. In the present embodiment, the plane of incidence 23 is provided on an inner surface side of the light guiding body 13 in a spherical shape and the plane of reflection 24 is provided on an outer surface side of the light guiding body 13.

Similarly, the diffusion portion 22 includes a first plane 25 positioned on the side of the plane of reflection 24 and a second plane 26 opposite to the first plane 25 and positioned on the side of the plane of incidence 23. The first plane 25 is a so-called emission surface to emit light to the outside wand is provided on the outer surface side of the light guiding body 13. The second plane 26 is a so-called diffusion surface that diffusively reflects light guided from the side of the introducing portion 21 toward the emission surface (first plane 25) and is provided on the inner surface side of the light guiding body 13. The second plane 26 is surface-treated such that a surface roughness thereof is made rougher by, for example, sandblasting.

The light guiding body 13 includes a first point 31 positioned on the border between the plane of reflection 24 and the first plane 25 and a second point 32 positioned opposite to the light source (LED) on the plane of incidence 23. The second point 32 is positioned in the neighborhood of the first end 16A. The lighting system 11 further includes a third point 33 as a center of curvature of the first plane 25 at the first point 31 (in the neighborhood of the first point 31). Note that the third point 33 can be the center of the light guiding body 13 when the light guiding body 13 is spherical.

The plane of incidence 23 of the introducing portion 21 is smoothly formed along the surface of the LED 16 (light emitting device). The plane of reflection 24 is formed in an arc shape. More specifically, like in the first embodiment, the plane of reflection 24 is formed such that Formula (1) in the first embodiment is satisfied so as to be able to totally reflect light entering from the plane of incidence 23 to the side of the diffusion portion 22.

The first plane 25 near the first point 31 is formed, like in the first embodiment, such that Formulas (2), (4), (5), and (6) in the first embodiment are satisfied so as to totally reflect light entering from the plane of incidence 23 to the side of the second plane 26.

Subsequently, the working of the lighting system 11 according to the present embodiment will be described with reference to FIG. 8 and the like. In the present embodiment, the plane of reflection 24 is formed such that Formula (1) is satisfied at any point (fourth point 34) on the plane of reflection 24. Thus, light emitted from the light source 12 (LED 16) toward the plane of reflection 24 is totally reflected and guided toward the diffusion portion 22 (see FIG. 1).

Similarly, in the present embodiment, the first plane 25 near the first point 31 is formed such that Formulas (2), (4), (5), and (6) are satisfied. Thus, light emitted from the light source 12 (LED 16) toward the first plane 25 near the first point 31 (or at the first point 31) is totally reflected and guided toward the diffusion portion 22.

The light guided to the diffusion portion 22 is diffused by the second plane 26 as a diffusion surface before being emitted to the outside via the first plane 25. In the present embodiment, light is emitted from the LED 16 in a direction in which the base 51 is present and the light is guided by the light guiding body 13 in the direction C2 opposite to the direction C1 in which the base 51 projects and thus, widely distributed light is realized.

According to the fourth embodiment, the lighting system 11 includes the base 51 provided opposite to the plane of reflection 24, the plurality of LEDs 16 emit light in a direction in which the base 51 is present, and the light guiding body 13 guides the light from the plurality of LEDs 16 in a direction moving away from the base 51. According to the configuration, a component of light emitted in the direction of the base 51 can be created thanks to the direction in which light of the plurality of LEDs 16 is emitted and the action of the light guiding body 13, and widely distributed light of 360° can be realized. Similarly, improvement of added value as design illumination can be realized thanks to the direction in which light of the plurality of LEDs 16 is emitted and action of the light guiding body 13.

In each of the above embodiments, the lighting system 11 is realized by setting the first plane 25 as the emission surface and the second plane 26 as the diffusion surface, but the embodiments are not limited to the above combination. For example, the lighting system 11 may be embodied by interchanging the configuration of the first plane 25 as the emission surface and the configuration of the second plane 26 as the diffusion surface. Alternatively, the lighting system 11 may be realized by using both of the first plane 25 and the second plane 26 as so-called diffusion surfaces by sandblasting the first plane 25 or forming white dots thereon by silk-screen printing.

Hereinafter, other inventions than those described in the above embodiments are added.

[1]

A lighting system accommodated inside the light guiding body and including a heat transfer portion having a marking surface on which information is marked.

According to the configuration, information can be marked on the heat transfer portion 52. Thus, various kinds of information (such as enterprise information, product information, and notes) can be communicated to the user while the lighting system 11 is not turned on. When the lighting system 11 is turned on, the light guiding body 13 emits light and the heat transfer portion 52 and the marking surface 53 inside are hidden and therefore, illumination quality is not affected.

[2]

A lighting system accommodated inside the light guiding body and including a heat transfer portion coated with a predetermined paint (a paint that changes color depending on the temperature or a luminous paint) on the surface thereof.

According to the configuration, the portion of the heat transfer portion 52 can also be caused to glow when the lighting system 11 is turned off or information marked for the user can be changed depending on the temperature of the heat transfer portion 52.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. A light guiding body comprising:
an introducing portion including a plane of incidence and a plane of reflection opposite to the plane of incidence;
a diffusion portion including a first plane provided on a side of the plane of reflection and a second plane provided on the side of the plane of incidence and opposite to the first plane;
a first point positioned on a border between the plane of reflection and the first plane; and
a second point on the plane of incidence, wherein
when a center of curvature of the first plane at the first point is a third point,
an index of refraction of the light guiding body is n,
the curvature of the first plane at the first point is K, and
a distance between the second point and the third point is D, $$\frac{1}{nD} \leq K$$

holds,
wherein a plane containing the plane of incidence intersects one of the plane of reflection and the first point,
when the distance between the first point and the second point is E, and
an angle formed by a line segment formed by the first point and the second point and a normal to the first plane at the first point is $\alpha$, $$K = \frac{\cos\alpha E \pm \sqrt{D^2 - \sin^2\alpha E^2}}{E^2 - D^2}$$

holds.

2. The light guiding body according to claim 1, wherein $$K = \frac{\cos\alpha E - \sqrt{D^2 - \sin^2\alpha E^2}}{E^2 - D^2}$$

holds.

3. The light guiding body according to claim 2, wherein $$\frac{1}{nD} \leq K \leq \frac{1}{D}$$

holds.

4. The light guiding body according to claim 3, wherein when a point on the plane of reflection is a fourth point, an angle $\beta$ formed by the line segment formed by the second point and the fourth point and the normal to the first plane at the fourth point is given by the following formula $$\beta \geq \sin^{-1}\left(\frac{1}{n}\right).$$

5. The light guiding body according to claim 4, wherein the plane containing the plane of incidence intersects the first point.

6. A lighting system comprising:
the light guiding body according to claim 5; and
a plurality of LEDs in a plate shape provided opposite to the plane of incidence and extending along the plane of incidence, wherein
the second point is positioned in a neighborhood of an end of each of the LEDs on the side of the diffusion portion.

7. The lighting system according to claim 6, wherein the light guiding body includes a through hole portion extending along a center axis thereof.

8. The lighting system according to claim 7, wherein the introducing portion is arranged near the center axis and the diffusion portion is arranged at a position farther from the center axis than the introducing portion.

9. The lighting system according to claim 8, wherein the LEDs emit light in a direction approaching the center axis and the light guiding body guides the light from the LEDs in the direction moving away from the center axis.

10. The lighting system according to claim 6, wherein the diffusion portion is arranged near the center axis and the introducing portion is arranged at a position farther from the center axis than the diffusion portion.

11. The lighting system according to claim 10, wherein the LEDs emit light in the direction moving away from the center axis and the light guiding body guides the light from the LEDs in the direction approaching the center axis.

12. The lighting system according to claim 6, further comprising: a base provided opposite to the plane of reflection, wherein the LEDs emit light to the side on which the base is present and the light guiding body guides the light from the LEDs in the direction moving away from the base.

\* \* \* \* \*